(12) United States Patent
Ozimek

(10) Patent No.: US 10,164,555 B1
(45) Date of Patent: Dec. 25, 2018

(54) VIRTUAL MID-BUS GENERATION IN A POWER SYSTEM FOR INDUSTRIAL CONTROL

(71) Applicant: Rockwell Automation Technologies, Inc., Mayfield Heights, OH (US)

(72) Inventor: Patrick E. Ozimek, Milwaukee, WI (US)

(73) Assignee: Rockwel Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/896,260

(22) Filed: Feb. 14, 2018

(51) Int. Cl.
| | | |
|---|---|---|
| *H02K 41/00* | (2006.01) | |
| *H02P 1/00* | (2006.01) | |
| *H02P 3/00* | (2006.01) | |
| *H02P 5/00* | (2016.01) | |
| *H02P 7/025* | (2016.01) | |
| *H02M 7/5395* | (2006.01) | |
| *B65G 54/02* | (2006.01) | |
| *H02M 3/155* | (2006.01) | |
| *H02K 41/035* | (2006.01) | |

(52) U.S. Cl.
CPC ............. *H02P 7/025* (2016.02); *B65G 54/02* (2013.01); *H02M 7/5395* (2013.01); *H02K 41/0358* (2013.01); *H02M 3/155* (2013.01)

(58) Field of Classification Search
CPC ................................ H02P 7/025; B65G 54/02
USPC ......................................................... 318/135
See application file for complete search history.

(56) References Cited

U.S. PATENT DOCUMENTS 5,825,641 A   10/1998   Mangtani

*Primary Examiner* — Erick Glass
(74) *Attorney, Agent, or Firm* — Boyle Fredrickson, S.C.

(57) ABSTRACT

A half-bridge inverter comprised of upper and lower switches can be placed in linear motor track sections to alternately connect a common point of all drive coils to a full-bus DC power rail ("full-bus") and a DC reference, according to PWM command signals, functioning as a "virtual mid-bus" to allow bi-directional flow of a sum of currents of all drive coils in the section. Separate upper and lower drive switches of the half-bridge inverters that are also connected to drive the drive coils can then be controlled, according to separate PWM command signals, to synchronize their PWM cycles and duty cycle commands with respect to the virtual mid-bus at times when a mover is not present, resulting in zero voltage across the drive coils, or command different duty cycles with respect to the virtual mid-bus when a mover is present, resulting in a desired voltage across the drive coils. The desired voltage can produce a current in the drive coils to electromagnetically propel the mover.

20 Claims, 10 Drawing Sheets

VIRTUAL MID-BUS GENERATION IN A POWER SYSTEM FOR INDUSTRIAL CONTROL

BACKGROUND INFORMATION

The present invention relates to motion control systems and, more specifically, to motion control systems including a track segment for linear motor drive systems supporting movers on tracks in which upper and lower mid-bus generation switches disposed in such track segments can receive Pulse Width Modulated (PWM) command signals for producing a virtual mid-bus to a common side of drive coils in the track segment which, in turn, can allow such drive coils to be used to electromagnetically propel movers along the track.

Motion control systems utilizing movers and linear motors can be used in a wide variety of processes (e.g. packaging, manufacturing, and machining) and can provide an advantage over conventional conveyor belt systems with enhanced flexibility, extremely high speed movement, and mechanical simplicity. The motion control system includes a set of independently controlled "movers" each supported on a track for motion along the track. The track is made up of a number of track segments or sections that, in turn, hold individually controllable electric coils. Successive activation of the coils establishes a moving electromagnetic field that interacts with the movers and causes the mover to travel along the track. Sensors, such as Hall Effect sensors or Magnetoresistance sensors, may be spaced at fixed positions along the track and/or on the movers for detecting opposing magnets to provide information about the position and speed of the movers.

Each of the movers may be independently moved and positioned along the track in response to the moving electromagnetic field generated by the coils. In a typical system, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product.

A DC (Direct Current) power supply is typically used to provide DC power to sections in the system. The DC power supply often provides a full-bus DC power rail ("full-bus"), a mid-bus DC power rail ("mid-bus") equal to about half the full-bus, and a DC reference. To propel the movers, switches in track segments are used to activate the drive coils with varying polarities and magnitudes between the full-bus and the DC reference, with currents bi-directionally sourcing or sinking with respect to the mid-bus.

Linear motor drive systems frequently use "half-bridge" inverters comprised of upper and lower switches to produce current in the drive coils which results in a propulsive force on the movers. Half-bridge inverters have the benefit that they require half the number of switches per drive coil as compared to a full-bridge inverter. However, half-bridge inverters often produce significant ripple current, regardless of the level of commanded current. Such ripple current provides no useful work in the system and causes excess heat and energy loss. Moreover, implementing a half-bridge inverter topology typically requires a special power supply that can generate and provide the mid-bus voltage rail. Such power supplies can be cumbersome to produce and expensive. It is therefore desirable to provide an improved linear motor drive system that may overcome one or more of the aforementioned drawbacks.

BRIEF DESCRIPTION

A half-bridge inverter comprised of upper and lower switches can be placed in linear motor track sections to alternately connect a common point of all drive coils to a full-bus DC power rail ("full-bus") and a DC reference, according to PWM command signals, functioning as a "virtual mid-bus" to allow bi-directional flow of a sum of currents of all drive coils in the section. Separate upper and lower drive switches of the half-bridge inverters that are also connected to drive the drive coils can then be controlled, according to separate PWM command signals, to synchronize their PWM cycles and duty cycle commands with respect to the virtual mid-bus at times when a mover is not present, resulting in zero voltage across the drive coils, or command different duty cycles with respect to the virtual mid-bus when a mover is present, resulting in a desired voltage across the drive coils. The desired voltage can produce a current in the drive coils to electromagnetically propel the mover. As a result of an available zero voltage state during the PWM cycle, undesirable ripple current can be reduced, allowing the system to operate more efficiently without the space and cost impact of using full-bridge inverters for each drive coil.

In one aspect, instead of connecting a common of motor drive coils in a track section to a DC mid-bus voltage rail produced by a power supply, the common can instead be connected to an additional half-bridge inverter leg within the section. This additional inverter leg could switch at a constant duty cycle, such as 50%, and could be synchronized to the switching period of all other phase inverters. Other inverters can continue to switch using duty cycle commands.

Specifically then, one aspect of the present invention provides: a power system for industrial control, including: a DC power supply configured to provide: a first voltage rail providing a full bus DC voltage; and a DC reference; multiple drive coils, in which first sides of the drive coils are coupled to a second voltage rail; multiple upper switches arranged between the first voltage rail and second sides of the drive coils, each upper switch being configured to selectively connect a second side of a drive coil to the first voltage rail; multiple lower switches arranged between the DC reference and the second sides of the drive coils, each lower switch being configured to selectively connect a second side of a drive coil to the DC reference; an upper mid-bus generation switch arranged between the first voltage rail and the second voltage rail, the upper mid-bus generation switch being configured to selectively connect the second voltage rail to the first voltage rail; and a lower mid-bus generation switch arranged between the DC reference and the second voltage rail, the lower mid-bus generation switch being configured to selectively connect the second voltage rail to the DC reference, in which the upper and lower mid-bus generation switches receive first PWM command signals according to a first duty cycle commanding the switches to provide the first voltage rail or the DC reference to the first side of the drive coils to produce a virtual mid-bus, and in which upper and lower switches corresponding to a drive coil receive second PWM command signals according to a second duty cycle commanding the switches to provide the first voltage rail or the DC reference to the second side of the drive coil.

In one aspect, centers of the first and second duty cycles can be aligned, and the second duty cycle can be increased or decreased by a predetermined amount from the first duty cycle for producing a voltage across a drive coil. In another aspect, left or the right edges of the first and second duty cycles can be aligned, and the second duty cycle can be increased or decreased by a predetermined amount from the first duty cycle for producing a voltage across a drive coil Another aspect of the present invention provides: a method for electromagnetically propelling a mover in a linear motor drive system, the method including: providing a first voltage rail and a DC reference from a DC power supply to a track segment, the first voltage rail providing a full bus DC voltage, the track segment defining a path along which a mover travels, the track segment receiving power from the DC power supply for electromagnetically propelling a mover, the track segment including: multiple drive coils spaced along the track segment, in which first sides of the drive coils are coupled to a second voltage rail; multiple upper switches arranged between the first voltage rail and second sides of the drive coils, each upper switch being configured to selectively connect a second side of a drive coil to the first voltage rail; multiple lower switches arranged between the DC reference and the second sides of the drive coils, each lower switch being configured to selectively connect a second side of a drive coil to the DC reference; an upper mid-bus generation switch arranged between the first voltage rail and the second voltage rail, the upper mid-bus generation switch being configured to selectively connect the second voltage rail to the first voltage rail; and a lower mid-bus generation switch arranged between the DC reference and the second voltage rail, the lower mid-bus generation switch being configured to selectively connect the second voltage rail to the DC reference; receiving first PWM command signals according to a first duty cycle commanding the upper and lower mid-bus generation switches to provide the first voltage rail or the DC reference to the first sides of the drive coils to produce a virtual mid-bus, and receiving second PWM command signals according to a second duty cycle commanding the upper and lower switches corresponding to a drive coil to provide the first voltage rail or the DC reference to the second side of the drive coil for electromagnetically propelling a mover when the track sensor detects a mover is proximal to the drive coil.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
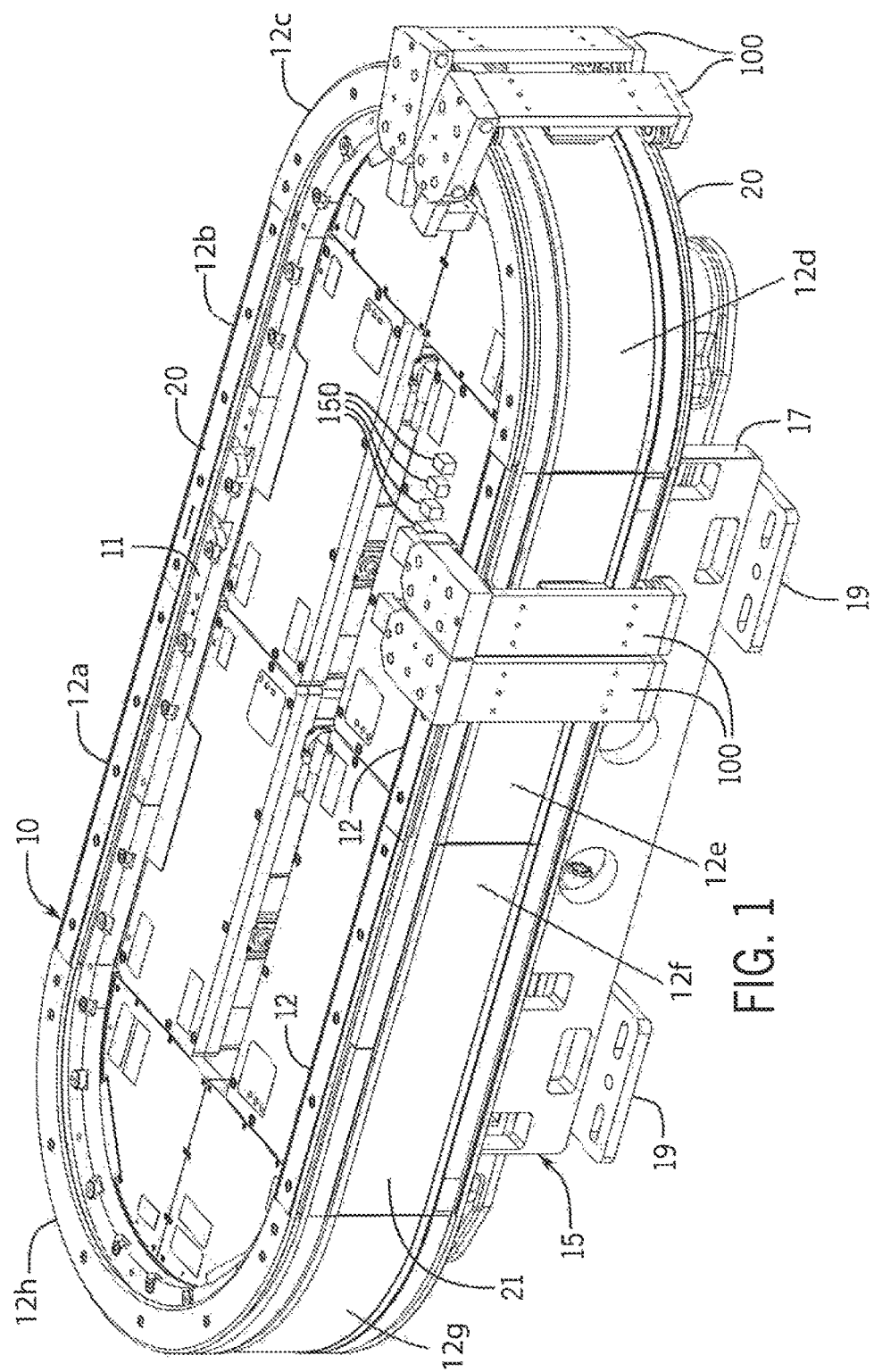
FIG. 1 is an isometric view of an exemplary transport system incorporating multiple movers travelling along a closed curvilinear track according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, an exemplary transport system for moving articles or products includes a track 10 made up of multiple segments 12 or sections, such as segments 12a, 12b, 12c and so forth. According to the illustrated embodiment, the segments 12 define a generally closed loop supporting a set of movers 100 movable along the track 10. The track 10 is oriented in a horizontal plane and supported above the ground by a base 15 extending vertically downward from the track 10. According to the illustrated embodiment, the base 15 includes a pair of generally planar support plates 17, located on opposite sides of the track 10, with mounting feet 19 on each support plate 17 to secure the track 10 to a surface. The illustrated track 10 includes four straight segments 12, with two straight segments 12 located along each side of the track and spaced apart from the other pair, such as straight segments 12a and 12b on a first side of the track 10, opposite straight segments 12e and 12f on a second side of the track 10. The track 10 also includes four curved segments 12 where a pair of curved segments 12 is located at each end of the track 10 to connect the pairs of straight segments 12, such as curved segments 12c and 12d on a first end of the track, opposite curved segments 12g and 12h on a second end of the track 10. As illustrated, the four straight segments 12 and the four curved segments 12 form a generally oval track and define a closed surface over which each of the movers 100 may travel. It is understood that track segments of various sizes, lengths, and shapes may be connected together to form a track 10 without deviating from the scope of the invention.

For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. Further, each track segment 12 is shown in a generally horizontal orientation. The track segments 12 may also be oriented in a generally vertical orientation and the width of the track 10 may be greater in either the horizontal or vertical direction according to application requirements. The movers 100 will travel along the track and take various orientations according to the configuration of the track 10 and the relationships discussed herein may vary accordingly.

Figure 3:
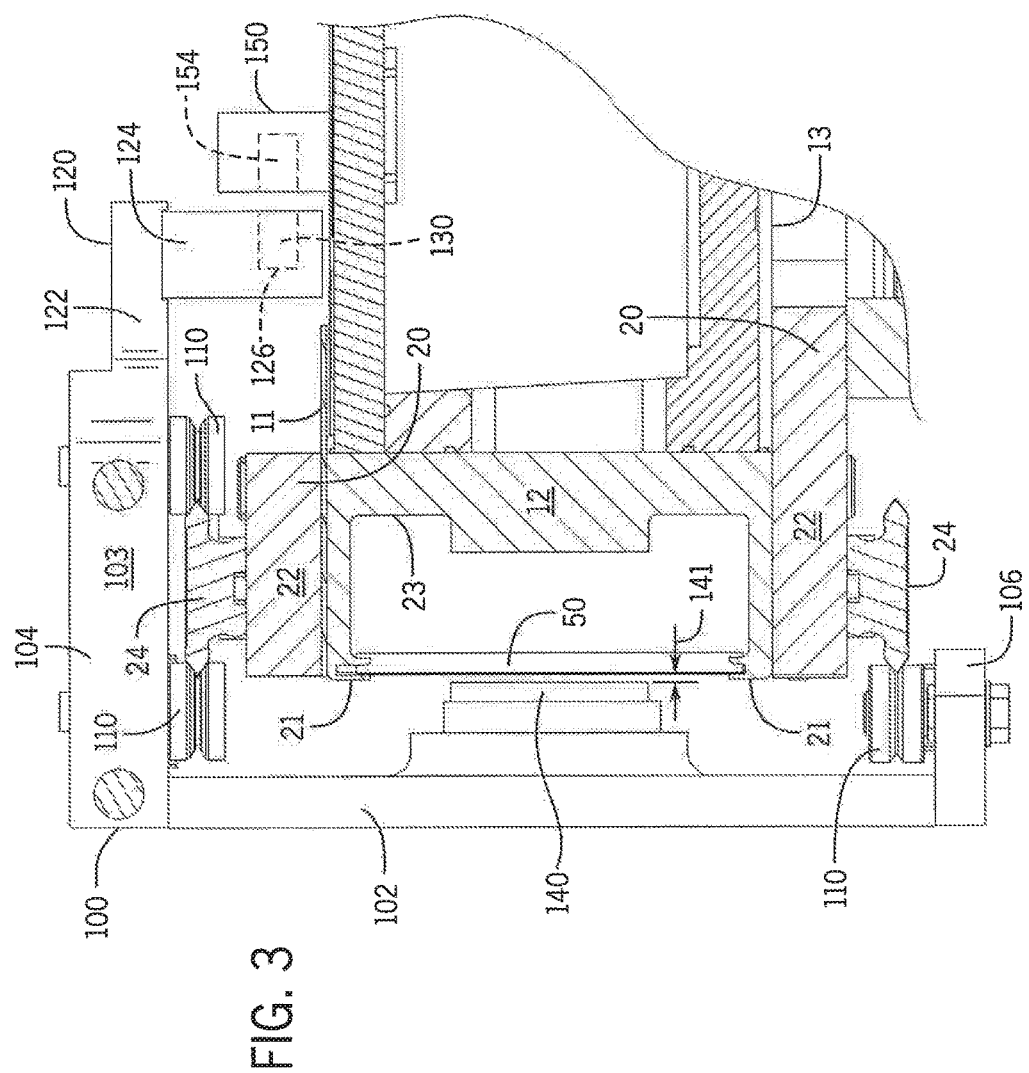
FIG. 3 is a partial sectional view of the transport system of FIG. 1.

Each track segment 12 includes a number of independently attached rails 20 on which each mover 100 runs. According to the illustrated embodiment, rails 20 extend generally along the outer periphery of the track 10. A first rail 20 extends along an upper surface 11 of each segment and a second rail 20 extends along a lower surface 13 of each segment. With reference also to FIG. 3, the illustrated embodiment of each rail 20 includes a base 22 and a track portion 24. The base 22 is secured to the upper surface 11 or lower surface 13 of each segment 12 and the track portion 24 is mounted to the base 22. It is contemplated that each rail 20 may be a singular, molded or extruded member or formed from multiple members. It is also contemplated that the cross section of the rails 20 may be circular, square, rectangular, or any other desired cross-sectional shape without deviating from the scope of the invention. The rails 20 generally conform to the curvature of the track 10 thus extending in a straight path along the straight track segments 12 and in a curved path along the curved track segments 12. The rails 20 may be thin with respect to the width of the track 10 and span only a partial width of the surface of the track 10 on which it is attached. Each mover 100 includes complementary rollers 110 to engage the track portion 24 of the rail 20 for movement along the track 10.

Figure 4:
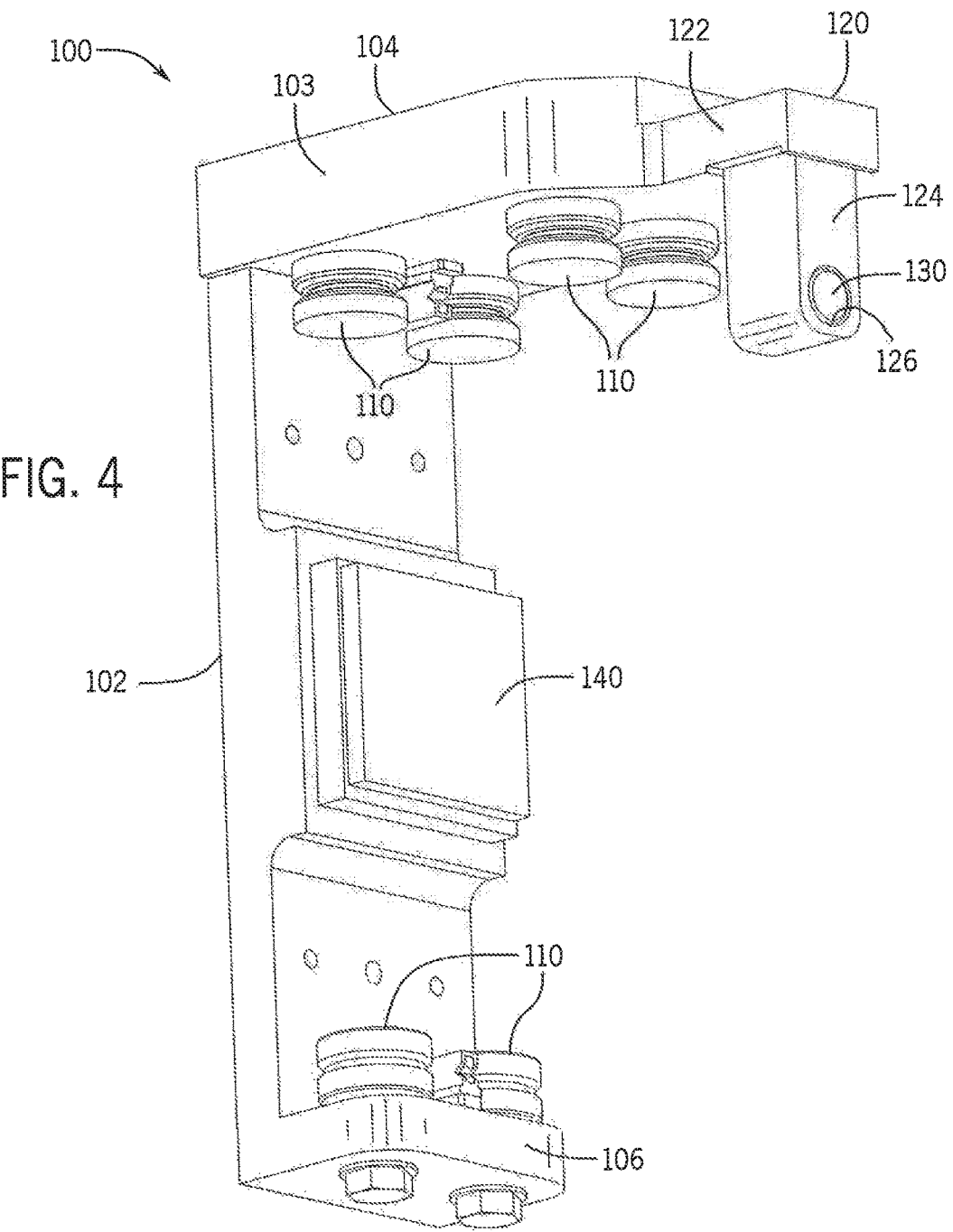
FIG. 4 is an isometric view of a mover from the transport system of FIG. 1.
Figure 5:
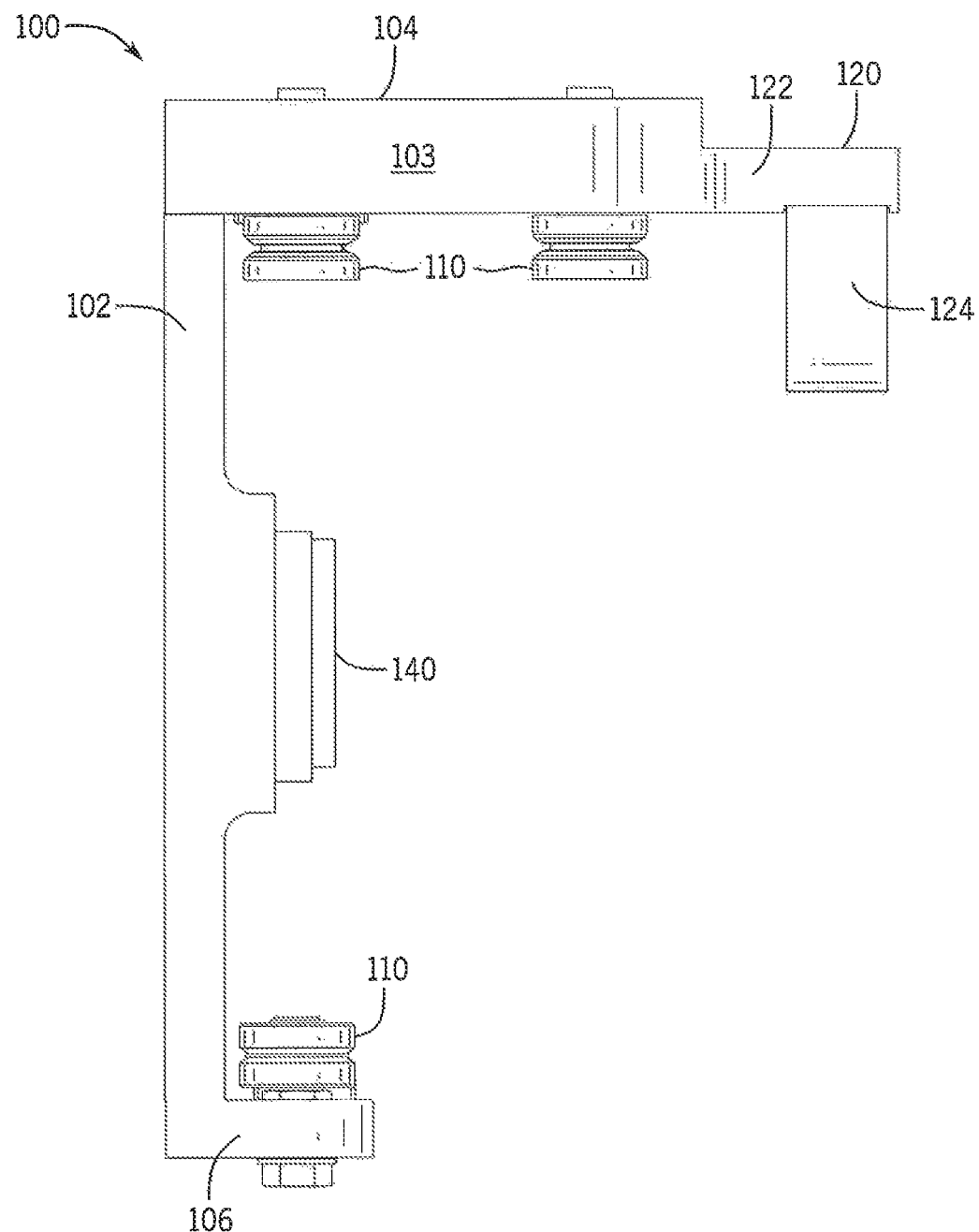
FIG. 5 is a side elevation view of the mover of FIG. 4.
Figure 6:
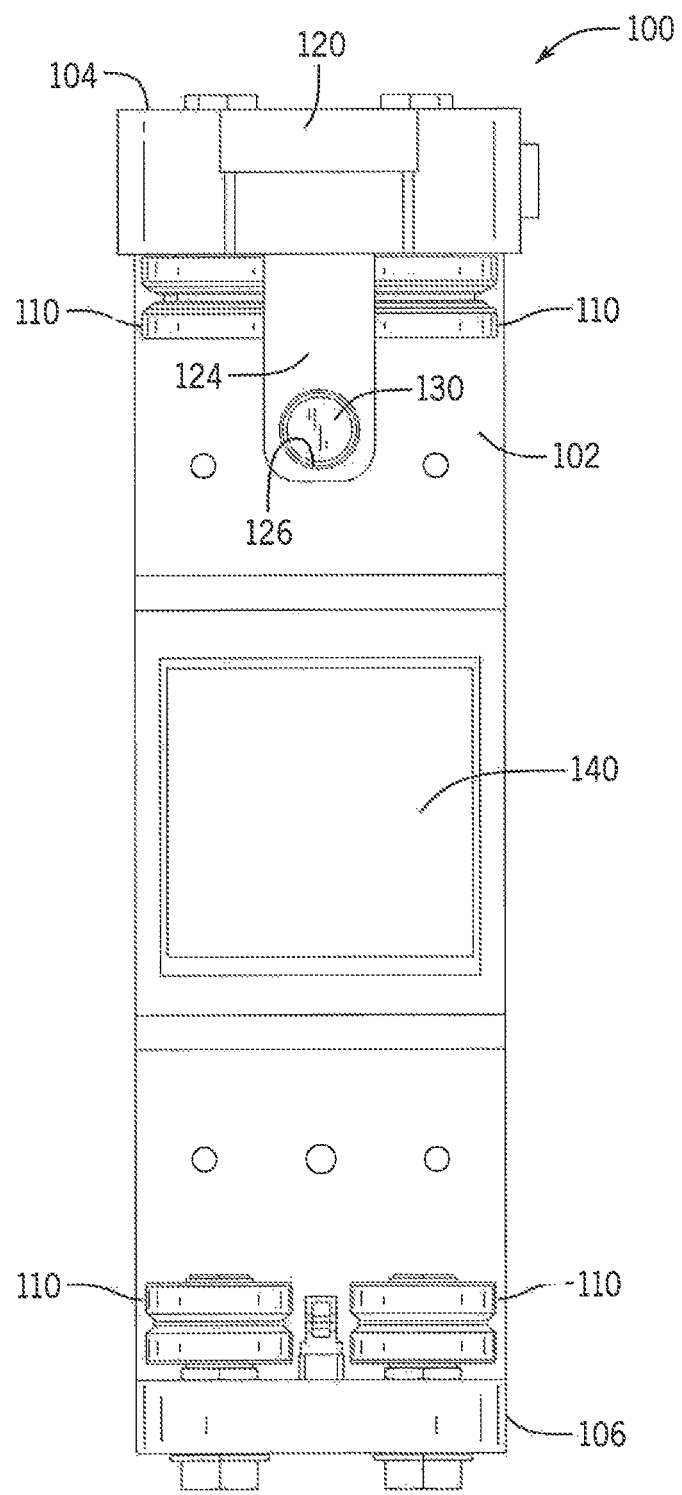
FIG. 6 is a front elevation view of the mover of FIG. 4.

One or more movers 100 are mounted to and movable along the rails 20 on the track 10. With reference next to FIGS. 4-6, an exemplary mover 100 is illustrated. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when mounted to the track 10. The top member 104 extends generally orthogonal to the side member 102 at a top end of the side member 102 and extends across the rail 20 on the top surface 11 of the track 10. The top member 104 includes a first segment 103, extending orthogonally from the side member 102 for the width of the rail 20, which is generally the same width as the side member 102. A set of rollers 110 are mounted on the lower side of the first segment 103 and are configured to engage the track portion 24 of the rail 20 mounted to the upper surface 11 of the track segment. According to the illustrated embodiment two pairs of rollers 110 are mounted to the lower side of the first segment 103 with a first pair located along a first edge of the track portion 24 of the rail and a second pair located along a second edge of the track portion 24 of the rail 20. The first and second edges and, therefore, the first and second pairs of rollers 110 are on opposite sides of the rail 20 and positively retain the mover 100 to the rail 20. The bottom member 106 extends generally orthogonal to the side member 102 at a bottom end of the side member 102 and extends for a distance sufficient to receive a third pair of rollers 110 along the bottom of the mover 100. The third pair of rollers 110 engage an outer edge of the track portion 24 of the rail 20 mounted to the lower surface 13 of the track segment. Thus, the mover 100 rides along the rails 20 on the rollers 110 mounted to both the top member 104 and the bottom member 106 of each mover 100. The top member 104 also includes a second segment 120 which protrudes from the first segment 103 an additional distance beyond the rail 20 and is configured to hold a position magnet 130. According to the illustrated embodiment, the second segment 120 of the top member 104 includes a first portion 122 extending generally parallel to the rail 20 and tapering to a smaller width than the first segment 103 of the top member 104. The second segment 120 also includes a second portion 124 extending downward from and generally orthogonal to the first portion 122. The second portion 124 extends downward a distance less than the distance to the upper surface 11 of the track segment but of sufficient distance to have the position magnet 130 mounted thereto. According to the illustrated embodiment, a position magnet 130 is mounted within a recess 126 on the second portion 124 and is configured to align with a track sensor 150 mounted to the top surface 11 of the track segment.

Figure 2:
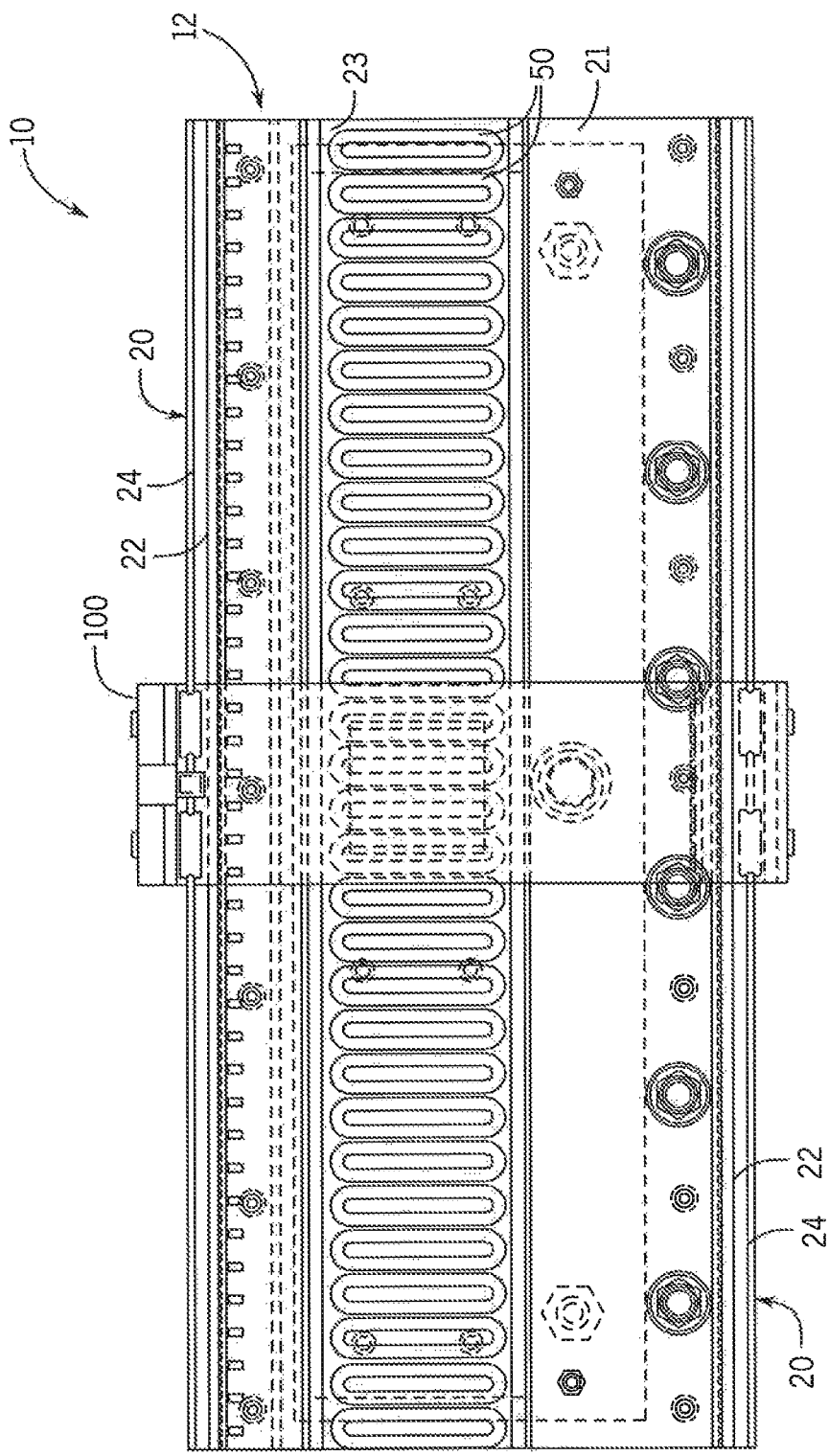
FIG. 2 is a partial side elevation view of one segment of the transport system of FIG. 1 illustrating activation coils distributed along one surface of the track segment.

A linear drive system is incorporated in part on each mover 100 and in part within each track segment 12 to control motion of each mover 100 along the segment. On each mover 100, the linear drive system includes multiple drive magnets 140 mounted to the side member 102. The drive magnets 140 can be arranged in a block along an inner surface of the side member 102 with separate magnet segments alternately having a north pole, N, and south pole, S, pole facing the track segment. The drive magnets 140 are typically permanent magnets, and two adjacent magnet segments including a north pole and a south pole may be considered a pole-pair. The drive magnets 140 are mounted on the inner surface of the side member 102 and when mounted to the track 10 are spaced apart from a series of coils 50 extending along the track 10. As shown in FIG. 3, an air gap 141 is provided between each set of drive magnets 140 and the coils 50 along the track 10. On the track 10, the linear drive system includes a series of parallel coils 50 spaced along each track segment 12 as shown in FIG. 2. According to the illustrated embodiment, each coil 50 is placed in a channel 23 extending longitudinally along one surface of the track segment 12. The electromagnetic field generated by each coil 50 spans the air gap and interacts with the drive magnets 140 mounted to the mover 100 to control operation of the mover 100.

Figure 7:
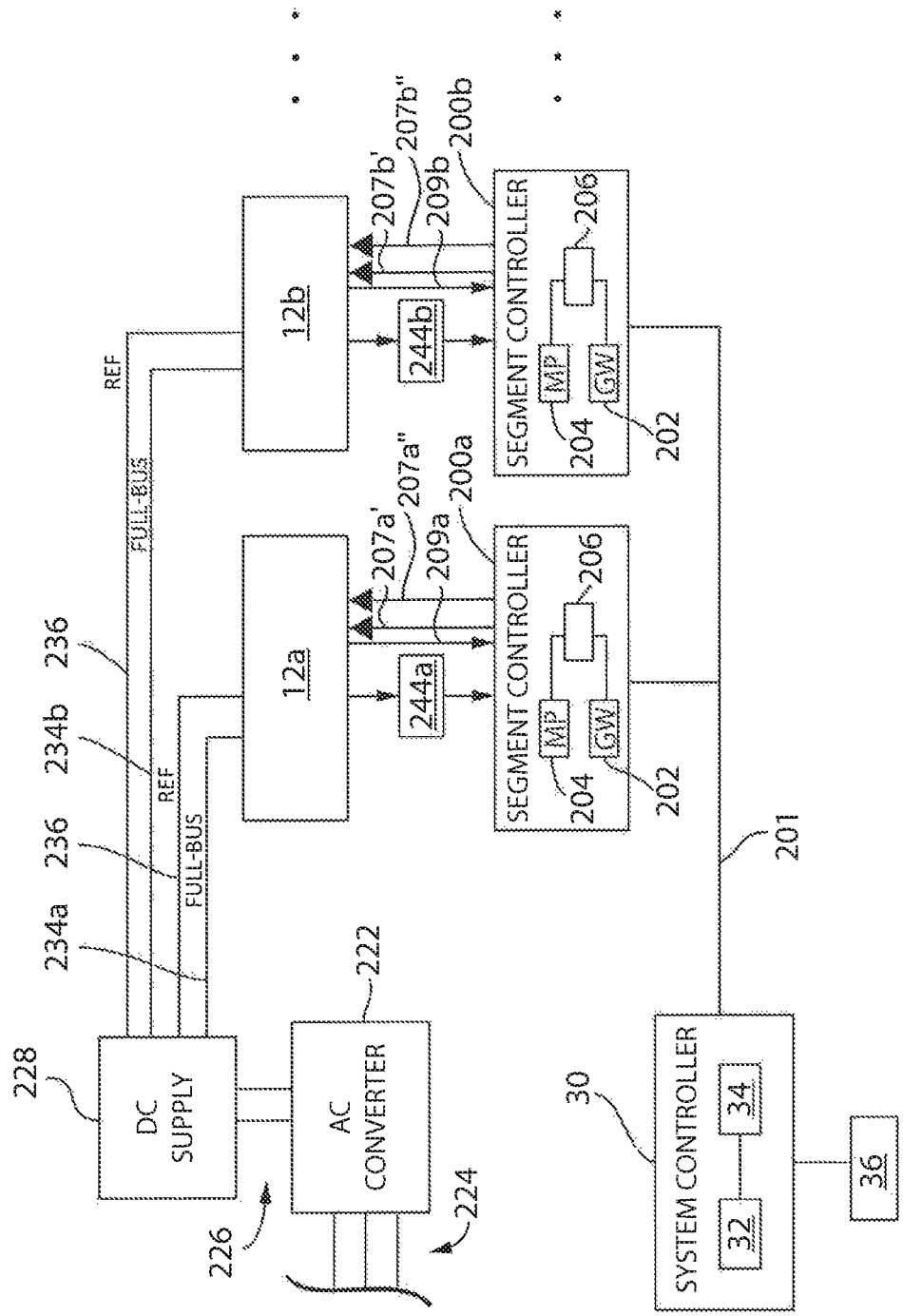
FIG. 7 is a block diagram representation of an exemplary power and control system for the transport system FIG. 1.

Turning next to FIG. 7, an exemplary power and control system for the track 10 and linear drive system is illustrated. A segment controller 200 is mounted within each segment 12, with two segment controllers 200 shown by way of example. The segment controller 200 receives command signals from a system controller 30 and generates switching signals for motor phases or power segments 210 (see FIG. 8), with six power segments 210 for each segment 12, shown by way of example, which, in turn, control activation corresponding coils 50. Activation of the coils 50 are controlled by switches in the power segments 210 to drive and position movers 100 along the track segment 12, according to Pulse Width Modulation (PWM) command signals received from the system controller 30. In a preferred embodiment, each segment 12 could include at least twelve power segments 210 with corresponding coils 50 spaced along the track.

The illustrated motion control system includes a system controller 30 having a processor 32 and a memory device 34. It is contemplated that the processor 32 and memory device 34 may each be a single electronic device or formed from multiple devices. The processor 32 may be a microprocessor. Optionally, the processor 32 and/or the memory device 34 may be integrated on a field programmable array (FPGA) or an application specific integrated circuit (ASIC). The memory device 34 may include volatile memory, non-volatile memory, or a combination thereof. The system controller 30 could be a Programmable Logic Controller (PLC). A user interface 36 is provided for an operator to configure the system controller 30 and to load or configure desired motion profiles for the movers 100 on the system controller 30. It is contemplated that the system controller 30 and user interface 36 may be a single device, such as a laptop, notebook, tablet or other mobile computing device. Optionally, the user interface 36 may include one or more separate devices such as a keyboard, mouse, display, touch-screen, interface port, removable storage medium or medium reader and the like for receiving information from and displaying information to a user. Optionally, the system controller 30 and user interface 36 may be integrated into an industrial computer mounted within a control cabinet and configured to withstand harsh operating environments. It is contemplated that still other combinations of computing devices and peripherals as would be understood in the art may be utilized or incorporated into the system controller 30 and user interface 36 without deviating from the scope of the invention.

One or more programs may be stored in the memory device 34 for execution by the processor 32. The system controller 30 receives one or more motion profiles for the movers 100 to follow along the track 10. A program executing on the processor 32 is in communication with a segment controller 200 on each track segment 12 via a control network 201, such as an EtherNet/IP network. The system controller 30 may transfer a desired motion profile to each segment controller 200 or, optionally, the system controller 30 may perform some initial processing based on the motion profile to transmit a segment of the motion profile to each segment controller 200 according to the portion of the motion profile to be executed along that segment. Optionally, the system controller 30 may perform still further processing on the motion profile and generate a desired switching sequence for each segment 12 that may be transmitted to the segment controller 200.

A gateway 202 in each segment controller 200 receives the communications from the system controller 30 and passes the communication to a processor 204 executing in the segment controller 200. The processor may be a microprocessor. Optionally, the processor 204 and/or a memory device 206 within the segment controller 200 may be integrated on a field programmable array (FPGA) or an application specific integrated circuit (ASIC). It is contemplated that the processor 204 and memory device 206 may each be a single electronic device or formed from multiple devices. The memory device 206 may include volatile memory, non-volatile memory, or a combination thereof. The segment controller 200 receives the motion profile, or portion thereof, or the switching sequence transmitted from the system controller 30 and utilizes the motion profile or switching sequence to control movers 100 present along the track segment 12 controlled by that system controller 30.

Figure 8:
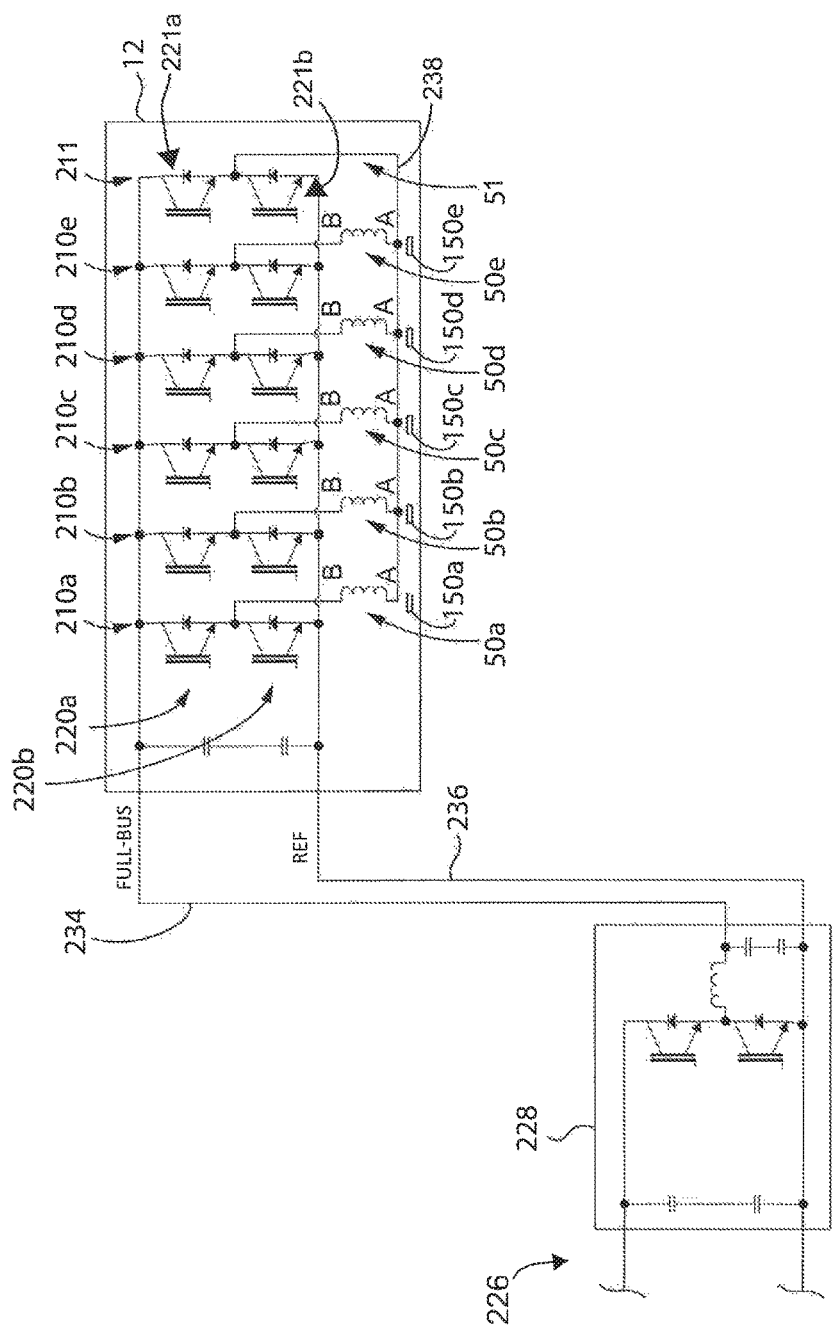
FIG. 8 is an exemplary schematic for a portion of the power system of FIG. 7 in accordance with an aspect of the invention.

With additional reference to FIG. 8, each segment controller 200 can generate power segment PWM command signals 207' to control operation of switching devices (switches) mounted within a segment 12 and mid-bus PWM command signals 207" to generate a virtual mid-bus within the segment 12 as will be described herein. The processor 204 can receive feedback signals 209 from track sensors 150 detecting position magnets 130 in movers 100, thereby providing an indication of the current operating conditions of power segments 210 and/or coils 50 connected to the power segments 210. The switches within each power segment 210 are connected between a power source and the coils 50. The switching signals are generated to sequentially energize coils 50 along a track segment, where the energized coils 50 create an electromagnetic field that interacts with the drive magnets 140 on each mover 100 to control motion of the movers 100 along the corresponding track segment 12. In particular, the power segment PWM command signals 207' control operation of switches 220 in communication with the drive coils 50, including upper switches 220a and lower switches 220b in the power segments 210, to connect the full-bus voltage rail 234 or the DC reference to the coils 50, according to a power segment duty cycle. The switches 220 may be solid-state devices that are activated by the power segment PWM command signals 207', including, but not limited to, transistors, such as insulated-gate bipolar transistors, metal oxide semiconductor field effect transistors, bipolar junction transistors, or the like.

According to the illustrated embodiment, an AC converter 222 (FIG. 7) can receive a single or multi-phase AC voltage 224 from a power grid. The AC converter 222, in turn, can provide a DC voltage 226 using, for example, a rectifier front end, at input terminals of a DC supply 228, which could be a DC-to-DC buck converter. The DC supply 228, in turn, can provide at input terminals of segments 12 a distributed DC bus, including: a full-bus DC voltage rail 234 configured to provide DC power at a full-bus voltage ("full-bus"), such as 400 V; and a DC reference voltage rail 236 configured to provide a DC reference ("DC-," "DC Reference," or "Ref") or common, such as ground (0 V), providing a current return path, to segments 12. In one configuration, the DC supply 228 can provide: a first full-bus voltage rail 234 and the DC reference 236 to a first segment 12; and a second full-bus voltage rail 234 and the DC reference 236 to a second segment 12; and so forth. Although a single DC supply 228 providing DC power to a single segment 12 is shown by way of example, alternative aspects of the invention could include a DC supply 228 providing DC power to multiple segments 12 that are daisy chained together, or multiple DC supplies 228 providing DC power to multiple segments 12, and/or a DC supply 228 having more outputs for providing DC power, such as more full-bus voltage rails 234, within the scope of the invention.

In each power segment 210, the processor 204 can drive the power segment PWM command signals 207' to control the various switches 220 to provide power to respective coils 50 for propelling a mover 100 while continuously receiving feedback signals 209 for determining positions of the mover 100. For example, in a first power segment 210a of the segment 12, the processor 204 of the segment controller 200a can drive the upper and lower switches 220a and 220b, respectively, via power segment PWM command signals 207a', to control a corresponding coil 50a in the first power segment 210a to propel the mover 100. The processor 204 can detect movement of the mover 100 from the first power segment 210a toward an area corresponding to the second power segment 210b by a track sensor 150a detecting a position magnet 130 of a mover 100 becoming distal to coil 50a, and generating a corresponding feedback signal 209a', and a track sensor 150b detecting the position magnet 130 of the mover 100 becoming proximal to coil 50b, and generating a corresponding feedback signal 209a''. The processor 204 can then drive the upper and lower switches 220a and 220b, respectively, via the power segment PWM command signals 207a', to control a corresponding coil 50b in the second power segment 210b to continue propelling the mover 100, according to a predetermined motion profile. In a preferred embodiment, at least three coils 50 could be used to propel any given mover 100 as required by the motion profile.

First sides of the coils 50 (identified in FIG. 8 as "A") can be coupled to a second voltage rail providing a virtual mid-bus within the segment 12. Second sides of the coils 50 (identified in FIG. 8 as "B") can be coupled to switches 220 of the power segments 210. In particular, in each power segment 210, the upper switches 220a can be arranged between the full-bus voltage rail 234 and the second sides of the coils 50, with each upper switch 220a being configured to selectively connect a second side of a drive coil 50 to the full-bus voltage rail 234. Also, in each power segment 210, the lower switches 220b can be arranged between the DC reference 236 and the second sides of the coils 50, with each lower switch 220b being configured to selectively connect the second side of the drive coil 50 to the DC reference 236. The coils 50 can be arranged between the switches 220 on an upper side and a common connection that is an internally generated virtual mid-bus rail 238 on a lower side. Accordingly, based on states of the switches 220 on either side of the coils 50, the voltage that to be applied across the coils 50 can be determined to produce the virtual mid-bus rail 238. In particular, with centers of the duty cycles configured by the power segment PWM command signals 207' and the mid-bus PWM command signals 207'' aligned, the duty cycles configured by the power segment PWM command signals 207' can be increased or decreased by a predetermined amount from the duty cycle for the mid-bus PWM command signals 207'' for producing voltages across the coils 50. For example, the duty cycles of the power segment PWM command signals 207' and the mid-bus PWM command signals 207'' could be 50% with complete alignment, and a duty cycle configured by a power segment PWM command signal 207' could be increased or decreased by 10%. Polarities of voltages across the coils 50 do not by themselves determine the polarities of currents flowing through the coils 50. A positive voltage across a coil 50 can yield a positive rate of change of current. However, if a current is already negative, a positive voltage can cause a current to trend in a positive direction. In effect, by controlling states of the switches 220, voltages can be applied across the coils 50, with currents resulting from such voltages, to provide a virtual mid-bus for propelling the mover 100.

The track sensors 150 can be spaced along the track segment 12, with each track sensor 150 being proximal to a coil 50. The track sensors 150 could be, for example, Hall effect sensors configured to detect position magnets 130 of movers 100. Accordingly, the track sensors 150 can detect movers when proximal to corresponding coils 50, and indicate such detection through corresponding feedback signals 209. Although a ratio of track sensors 150 to coils 50 is illustrated in FIG. 8 as being 1:1, a greater or lesser number of track sensors 150 (than coils 50) could be present. In a preferred aspect, there may be more track sensors 150 present than coils 50.

In accordance with an aspect of the invention, in a half-bridge inverter leg 211, an upper mid-bus generation switch 221a can be arranged between the full-bus voltage rail 234 and the virtual mid-bus rail 238. That is, the upper mid-bus generation switch 221a can directly connect 51 the full-bus voltage rail 234 to the virtual mid-bus rail 238 without a coil or filter in between. The upper mid-bus generation switch 221a can be configured to selectively connect the virtual mid-bus rail 238 to the full-bus voltage rail 234. Also, in the half-bridge inverter leg 211, a lower mid-bus generation switch 221b can be arranged between the DC reference 236 and the virtual mid-bus rail 238. That is, the lower mid-bus generation switch 221b can directly connect 51 the DC reference 236 to the virtual mid-bus rail 238 without a coil or filter in between. The lower virtual mid-bus switch 221b can be configured to selectively connect the virtual mid-bus rail 238 to the DC reference 236. The upper and lower mid-bus generation switches 221a and 221b, respectively, can receive mid-bus Pulse Width Modulated (PWM) command signals 207'', according to a mid-bus duty cycle, which is preferably 50%, commanding the switches 221 to provide the full-bus voltage rail 234 or the DC reference 236 to the first sides of the coils 50 (identified in FIG. 8 as "A") to produce the virtual mid-bus. Accordingly, the half-bridge inverter leg 211 can produce an averaged mid-bus DC power rail ("mid-bus" or "virtual mid-bus") in the section for drive coils 50 at a common point. In one aspect, with the full-bus voltage rail 234 configured to provide about 400 V, and the DC reference 236 configured about 0 V, the virtual mid-bus rail 238 could average about 200 V. However, in other aspects, the full-bus voltage rail 234 and/or the DC reference 236 could provide different voltage levels, and/or the mid-bus duty cycle could vary, to produce a different average at the virtual mid-bus rail 238. The switches 221 could be identical in construction to the switches 220, such as insulated-gate bipolar transistors, metal oxide semiconductor field effect transistors, bipolar junction transistors, or the like As a result, upper and lower switches 220a and 220b, respectively, in power segments 210, can be controlled, according to the power segment PWM command signals 207', to synchronize with the half-bridge inverter leg 211, and the mid-bus PWM command signals 207'', at times when movers 100 are not present. This can efficiently result in zero voltage across the drive coils 50. Moreover, in another aspect, the upper and lower switches 220a and 220b, respectively, can float (allow an infinite impedance or tri state condition) the second side of the drive coil at times when movers 100 are not present. However, at times when a mover is present, the upper and lower switches 220a and 220b, respectively, can then be controlled, according to the power segment PWM command signals 207', to offset from the half-bridge inverter leg 211, and the mid-bus PWM command signals 207'', by a predetermined amount. The center point of the PWM cycles should be aligned in each case. In order to produce voltage across the coils 50, the duty cycle of the PWM command signals 207' relative to the duty cycle of the half-bridge inverter leg 211 is either increased or decreased. This relative difference in duty cycle produces an effective average voltage across the coils 50. The offset could be, for example, a 10% offset. This can result in a desired voltage across the drive coil 50. The desired voltage can, in turn, produce a current in the drive coil 50 to electromagnetically propel movers 100. In one aspect, the processor 204 can execute a program stored in the memory device 206 to coordinate control of the power segment PWM command signals and the mid-bus PWM command signals to electromagnetically propel movers 100. Consequently, the system can operate more efficiently by reducing undesirable ripple current.

Figure 9:
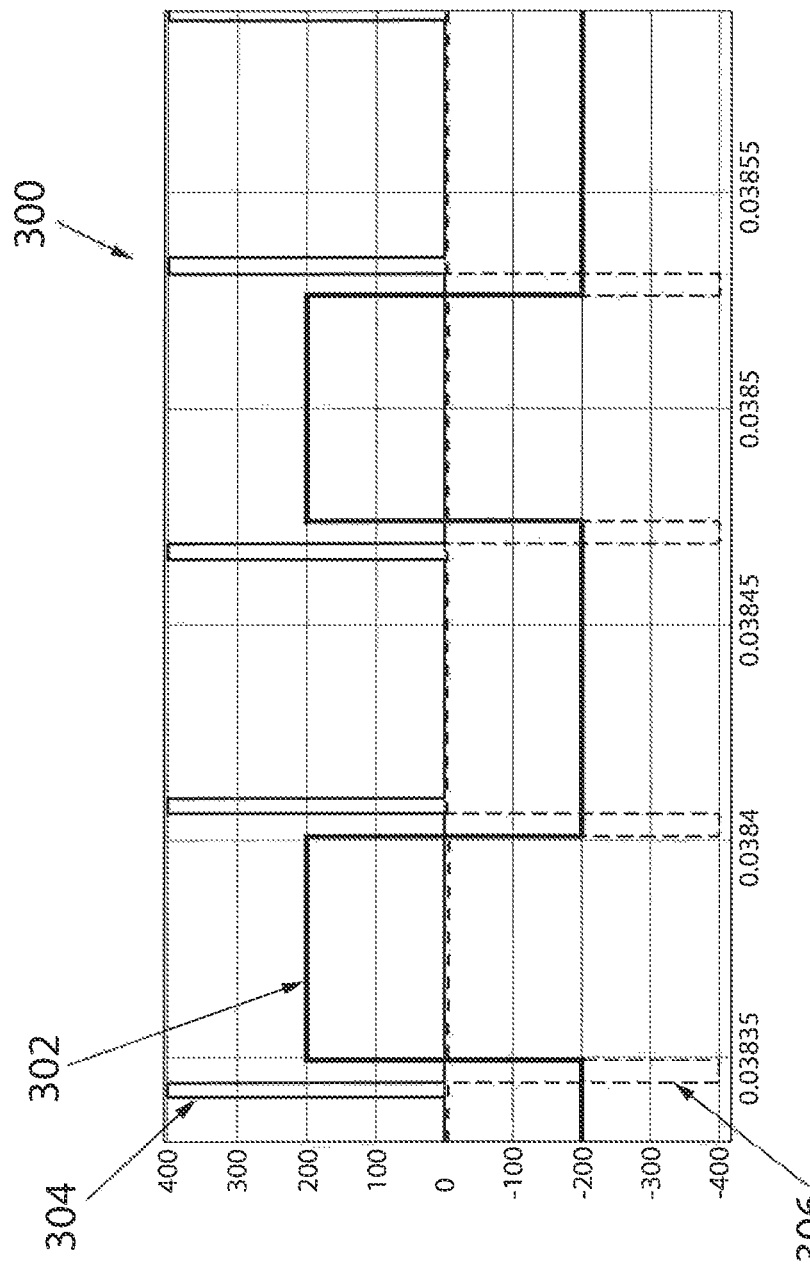
FIG. 9 is a timing diagram illustrating exemplary voltages across a drive coil under various conditions, including with the power system of FIG. 8.
Figure 10:
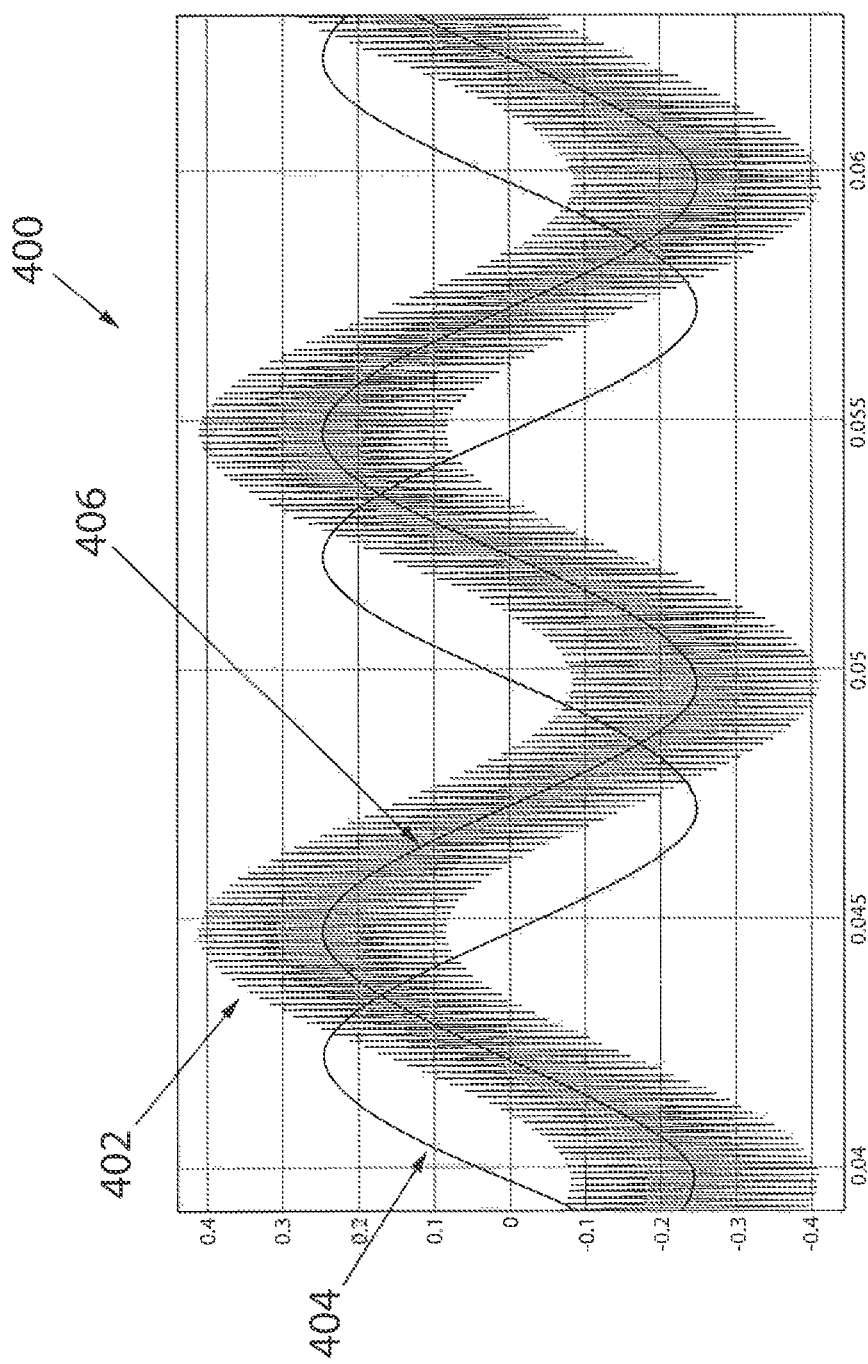
FIG. 10 is a timing diagram illustrating drive coil currents corresponding to the exemplary voltages of FIG. 9.

Referring now to FIGS. 9 and 10 together, a first timing diagram 300 (FIG. 9) illustrates exemplary voltages across a drive coil 50 under various conditions, and a second timing diagram 400 (FIG. 10) illustrates exemplary drive coil currents corresponding to the voltages of the first timing diagram 300. In a first exemplary voltage waveform 302, voltage across a drive coil 50 can continuously cycle between positive and negative mid-level voltages during operation. For example, with a full-bus voltage of 400 V, a virtual mid-bus of 200 V, and a DC reference of 0 V, voltage across the drive coil 50 could continuously cycle between +200 V and −200 V. This could occur, for example, in a system in which a fixed virtual mid-bus is provided on one side of the drive coil 50 and switches providing a full-bus voltage or a DC reference are provided on the other side of the drive coil 50. However, this constant cycling between polarities can cause excessive ripple current, as illustrated in a coil current waveform 402 corresponding to the first exemplary voltage waveform 302.

However, in accordance with an aspect of the invention, with upper and lower switches 220a and 220b, respectively, generating the virtual mid-bus rail 238 within the segment 12, as described above with respect to FIG. 8, voltage across a drive coil 50 can cycle between a positive full-bus voltage level and zero volts, as shown in a second exemplary voltage waveform 304, or between a negative full-bus voltage level and zero volts, as shown in a third exemplary voltage waveform 306. For example, with a full-bus voltage of 400 V and a DC reference of 0 V, voltage across the drive coil 50 could continuously cycle between +400 V and 0 V (as shown in the second exemplary voltage waveform 304), or could continuously cycle between −400 V and 0 V (as shown in the third exemplary voltage waveform 306). This minimization of polarity changes, with substantial amounts of time corresponding to zero volts, can significantly reduce ripple current, as illustrated in second and third coil current waveforms 404 and 406 corresponding to the second and third exemplary voltage waveforms 304 and 306, respectively.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. A power system for industrial control, comprising:
a DC power supply configured to provide:
a first voltage rail providing a full bus DC voltage; and
a DC reference;
a plurality of drive coils, wherein first sides of the plurality of drive coils are coupled to a second voltage rail;
a plurality of upper switches arranged between the first voltage rail and second sides of the plurality of drive coils, each upper switch being configured to selectively connect a second side of a drive coil to the first voltage rail;
a plurality of lower switches arranged between the DC reference and the second sides of the plurality of drive coils, each lower switch being configured to selectively connect the second side of a drive coil to the DC reference;
an upper mid-bus generation switch arranged between the first voltage rail and the second voltage rail, the upper mid-bus generation switch being configured to selectively connect the second voltage rail to the first voltage rail; and
a lower mid-bus generation switch arranged between the DC reference and the second voltage rail, the lower mid-bus generation switch being configured to selectively connect the second voltage rail to the DC reference,
wherein the upper and lower mid-bus generation switches receive first Pulse Width Modulated (PWM) command signals according to a first duty cycle commanding the switches to provide the first voltage rail or the DC reference to the first side of the plurality of drive coils to produce a virtual mid-bus, and
wherein upper and lower switches of the pluralities of upper and lower switches corresponding to a drive coil receive second PWM command signals according to a second duty cycle commanding the switches to provide the first voltage rail or the DC reference to the second side of the drive coil.

2. The system of claim 1, wherein centers of the first and second duty cycles are aligned, and wherein the second duty cycle is increased or decreased by a predetermined amount from the first duty cycle for producing a voltage across a drive coil.

3. The system of claim 2, wherein the first duty cycle for the first PWM command signals is 50%.

4. The system of claim 3, wherein the second duty cycle is increased or decreased by at least 10%.

5. The system of claim 1, further comprising a track sensor for detecting a mover proximal to a drive coil, wherein upper and lower switches of the pluralities of upper and lower switches corresponding to a drive coil float the second side of the drive coil when the track sensor does not detect a mover proximal to the drive coil.

6. The system of claim 1, wherein the upper and lower mid-bus generation switches and the switches of the pluralities of upper and lower switches are insulated-gate bipolar transistors.

7. The system of claim 1, wherein the first voltage rail provides at least 400 Volts and the second voltage rail averages to at least 200 Volts.

8. The system of claim 1, wherein the plurality of drive coils are spaced along a track segment defining a path along which a mover travels, wherein the track segment is a first track segment, and further comprising a second track segment receiving the first voltage rail and the DC reference from the DC power supply, and wherein the mover is electromagnetically propelled from the first track segment to the second track segment.

9. The system of claim 1, further comprising a controller executing a program stored in a non-transient medium to coordinate control of the first and second PWM command signals.

10. The system of claim 1, wherein the plurality of drive coils includes at least twelve drive coils, and wherein at least three of the at least twelve drive coils are used to electromagnetically propel a mover.

11. A method for electromagnetically propelling a mover in a linear motor drive system, the method comprising:
providing a first voltage rail and a DC reference from a DC power supply to a track segment, the first voltage rail providing a full bus DC voltage, the track segment defining a path along which a mover travels, the track segment receiving power from the DC power supply for electromagnetically propelling a mover, the track segment including:
a plurality of drive coils spaced along the track segment, wherein first sides of the plurality of drive coils are coupled to a second voltage rail;
a plurality of upper switches arranged between the first voltage rail and second sides of the plurality of drive coils, each upper switch being configured to selectively connect a second side of a drive coil to the first voltage rail;
a plurality of lower switches arranged between the DC reference and the second sides of the plurality of drive coils, each lower switch being configured to selectively connect the second side of a drive coil to the DC reference;
an upper mid-bus generation switch arranged between the first voltage rail and the second voltage rail, the upper mid-bus generation switch being configured to selectively connect the second voltage rail to the first voltage rail; and
a lower mid-bus generation switch arranged between the DC reference and the second voltage rail, the lower mid-bus generation switch being configured to selectively connect the second voltage rail to the DC reference;
receiving first Pulse Width Modulated (PWM) command signals according to a first duty cycle commanding the upper and lower mid-bus generation switches to provide the first voltage rail or the DC reference to the first sides of the plurality of drive coils to produce a virtual mid-bus, and
receiving second PWM command signals according to a second duty cycle commanding the upper and lower switches of the pluralities of upper and lower switches corresponding to a drive coil to provide the first voltage rail or the DC reference to the second side of the drive coil for electromagnetically propelling a mover when the track sensor detects a mover is proximal to the drive coil.

12. The method of claim 11, wherein centers of the first and second duty cycles are aligned, and wherein the second duty cycle is increased or decreased by a predetermined amount from the first duty cycle for the first PWM command signals for producing a voltage across a drive coil for electromagnetically propelling the mover.

13. The method of claim 12, wherein the first duty cycle for the first PWM command signals is 50%.

14. The method of claim 13, wherein the second duty cycle is increased or decreased by at least 10%.

15. The method of claim 1, wherein upper and lower switches of the pluralities of upper and lower switches corresponding to a drive coil float the second side of the drive coil when the track sensor does not detect a mover proximal to the drive coil.

16. The method of claim 11, wherein the upper and lower mid-bus generation switches and the switches of the pluralities of upper and lower switches are insulated-gate bipolar transistors.

17. The method of claim 11, wherein the first voltage rail provides at least 400 Volts and the second voltage rail averages to at least 200 Volts.

18. The method of claim 11, wherein the track segment is a first track segment, and further comprising receiving the first voltage rail and the DC reference from the DC power supply at a second track segment, and wherein the mover is electromagnetically propelled from the first track segment to the second track segment.

19. The method of claim 11, further comprising coordinating control of the first and second PWM command signals according to a program stored in a non-transient medium for electromagnetically propelling the mover.

20. The method of claim 11, wherein the track segment includes at least twelve drive coils, and wherein at least three of the at least twelve drive coils are used to electromagnetically propel a mover when detected.

* * * * *

UNITED STATES PATENT AND TRADEMARK OFFICE
CERTIFICATE OF CORRECTION

PATENT NO. : 10,164,555 B1  
APPLICATION NO. : 15/896260  
DATED : December 25, 2018  
INVENTOR(S) : Patrick E. Ozimek Page 1 of 1

It is certified that error appears in the above-identified patent and that said Letters Patent is hereby corrected as shown below:

On the Title Page

Assignee: (73), Line 1 Delete "Rockwel" and substitute therefor -- Rockwell --.

In the Claims

Claim 15, Column 14, Line 27 Delete "claim 1" and substitute therefor -- claim 11 --.

Signed and Sealed this
Nineteenth Day of February, 2019

Andrei Iancu
*Director of the United States Patent and Trademark Office*